United States Patent
Johnson et al.

(10) Patent No.: US 7,088,710 B1
(45) Date of Patent: Aug. 8, 2006

(54) METHOD OF TRANSMITTING INFORMATION THROUGH DATA SWITCHING APPARATUS AND APPARATUS THEREFOR

(75) Inventors: Ian David Johnson, Manchester (GB); Michael Patrick Robert Collins, Manchester (GB); Paul Howarth, Manchester (GB)

(73) Assignee: Xyratex Technology Limited, Hampshire (GB)

( * ) Notice: Subject to any disclaimer, the term of this patent is extended or adjusted under 35 U.S.C. 154(b) by 0 days.

(21) Appl. No.: 09/869,091

(22) PCT Filed: Nov. 10, 1999

(86) PCT No.: PCT/GB99/03748

§ 371 (c)(1),
(2), (4) Date: Oct. 23, 2001

(87) PCT Pub. No.: WO00/38375

PCT Pub. Date: Jun. 29, 2000

(30) Foreign Application Priority Data

Dec. 22, 1998 (GB) ................................ 9828144.7

(51) Int. Cl.
*H04L 12/56* (2006.01)
(52) U.S. Cl. .................... 370/357; 370/395.4; 370/412
(58) Field of Classification Search ............... 370/414, 370/357
See application file for complete search history.

(56) References Cited

U.S. PATENT DOCUMENTS

| 6,072,772 A * | 6/2000 | Charny et al. ............ 370/229 |
| 6,515,991 B1 * | 2/2003 | McKeown ................ 370/390 |
| 6,539,025 B1 * | 3/2003 | Manning et al. ............ 370/414 |
| 6,563,837 B1 * | 5/2003 | Krishna et al. ............ 370/413 |
| 6,667,984 B1 * | 12/2003 | Chao et al. ................ 370/414 |
| 6,865,154 B1 * | 3/2005 | Charny et al. ............ 370/235 |

FOREIGN PATENT DOCUMENTS

| EP | 0849916 | 6/1998 |
| WO | 0038375 | 6/2000 |

OTHER PUBLICATIONS

McKeown et al., "Tiny Tera: A Packet Switch Core", IEEE Micro, 1997, pp. 26-33, XP 000642693.

* cited by examiner

*Primary Examiner*—Seema S. Rao
*Assistant Examiner*—Robert C. Scheibel, Jr.
(74) *Attorney, Agent, or Firm*—Pillsbury Winthrop Shaw Pittman LLP

(57) ABSTRACT

A data switch for handling packets of information; the switch includes input traffic managers, ingress routers, a memoryless cyclic switch fabric, egress routers and output traffic managers all acting under the control of a switch controller. Each ingress router includes a set of virtual output buffers one for each output traffic manager and each message priority. Each data packet or cell as it arrives is examined to identify the output traffic manager address and its message priority. The switch controller uses a first arbitration and selection process to schedule the passage of the next cell across the switch fabric which the ingress router uses a second arbitration and selection process to select the appropriate virtual output queue for use in the switch fabric transfer.

12 Claims, 13 Drawing Sheets

Figure 1:
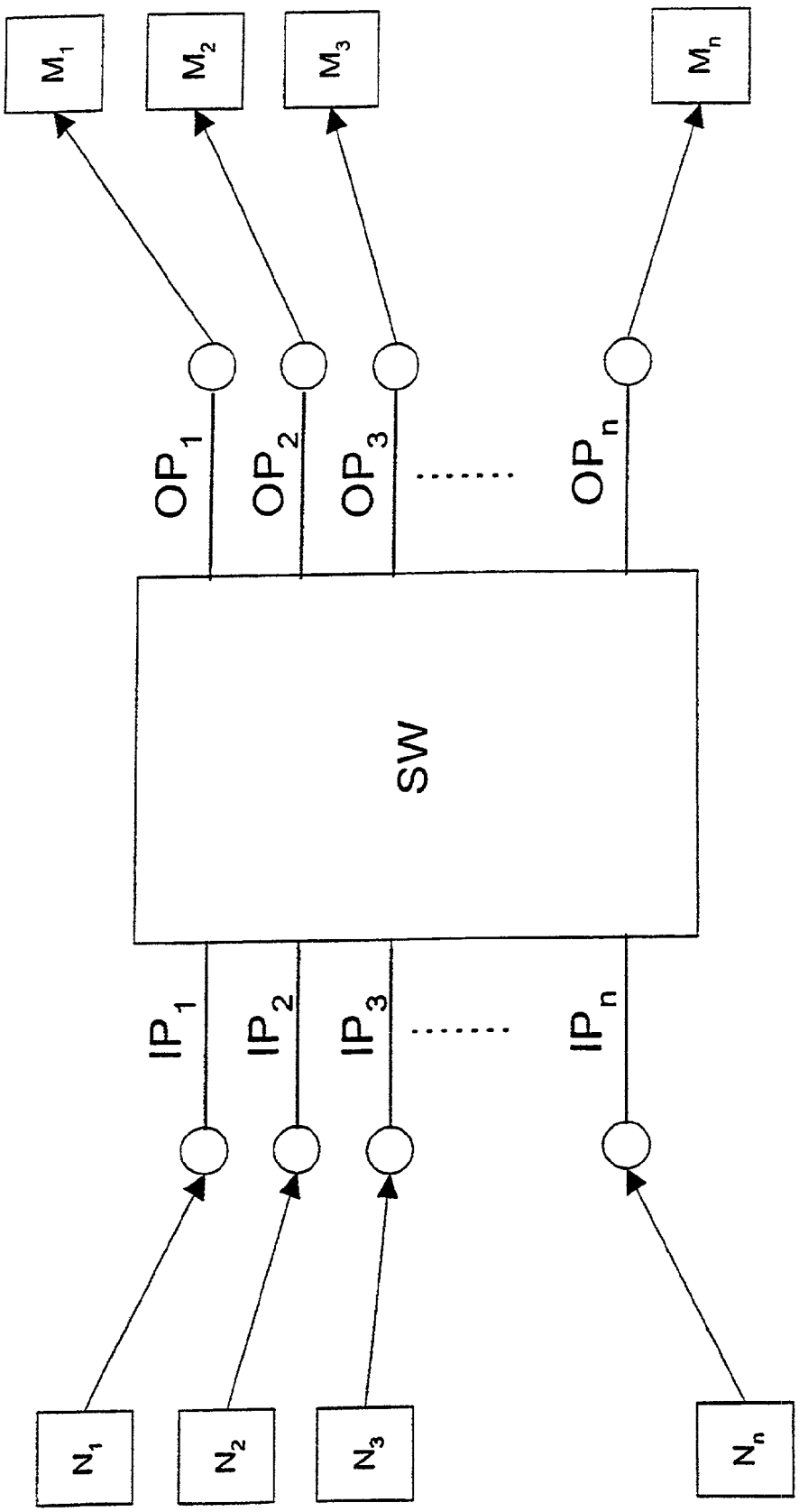

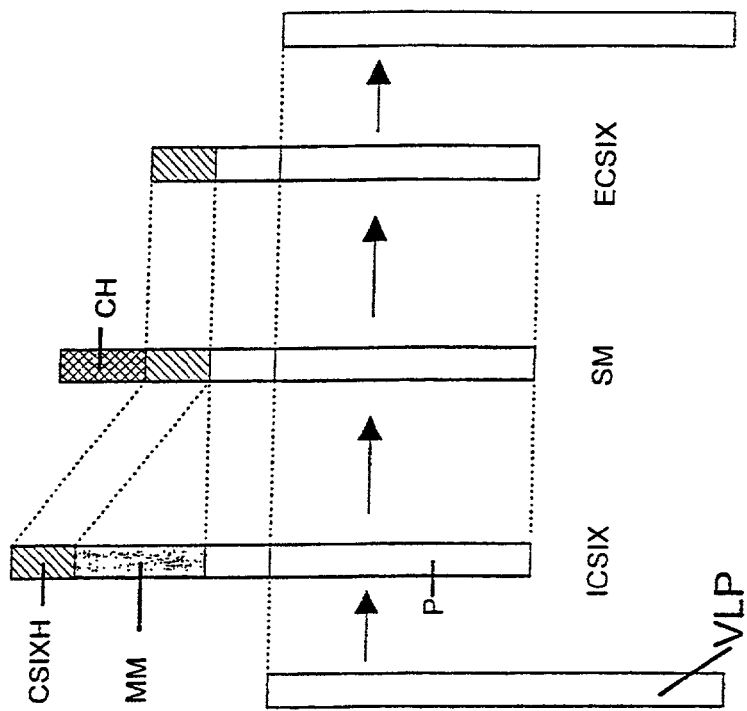
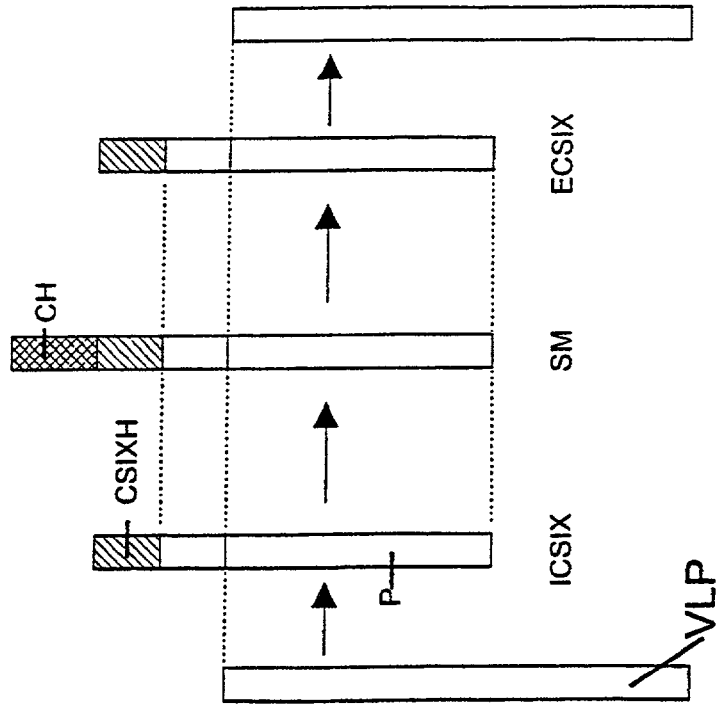
Fig 6.

METHOD OF TRANSMITTING INFORMATION THROUGH DATA SWITCHING APPARATUS AND APPARATUS THEREFOR

BACKGROUND OF THE INVENTION

This invention relates to a method of data switching which takes application data from numerous input sources and routes it to numerous destination outputs and to apparatus for performing such switching.

In a generalisation of such a concept, data arriving on input ports is routed via a non-blocking cross bar switch to output ports. For an input N to transfer data to an output M the switch establishes a 'connection' between N and M. The connection generally remains for the duration of the data transfer at which point it may be broken and the output allowed to be connected to another input. Data is typically transferred in 'cells'.

Because there are numerous inputs competing for numerous output ports the possibility of contention occurs. The output port can be considered to be a resource that must be shared amongst multiple inputs. This means that a particular input may not be able to connect to a particular output because that output is already in use i.e. is already connected to another port. It is also possible that more than one input may be requesting a connection to the same output. In either case the result is the need for the cells or data products to queued (buffered) until the relevant resource becomes available.

Cells can be stored in several areas in the switch; the input, the output and centrally. Most switches use a combination of all three. It is generally considered that output buffering provides the most efficient way for handling traffic shaping i.e. the profile of the release of cells from the switch. However, output buffering places severe requirements on the actual storage device used to create the buffer. This is because the buffer is shared amongst multiple inputs which means that the storage devices must be very high performance. Hence, at very high data rates current technology limits the use of output buffers.

The article "Tiny Tera: a packet switch core", IEEE Micro, US, IEEE Inc. New York, vol. 17, no. 1, 1997, p26–33, discloses a data switch having a crossbar interface controlled by a scheduler. The input to the switch includes a number of "port cards". Each port card comprises a number of data slices, which each generate a 64-bit section ("chunk") of a message. On each port card there is a single port processor, which determines where data slice should store each chunk. Upon receipt of a packet of data, the port processor informs a scheduler of newly arrived packets. The scheduler controls the crossbar interface to connect the data slices to outputs of the switch.

It is an object of the invention to provide a data switching method and apparatus for a more efficient handling of packets of information through a data switch.

According to a first aspect of the invention there is provided a method according to claim 1.

According to a second aspect of the invention there is provided a data switch according to claim 7.

Preferably, each ingress router maintains an input buffer for each of the group of input traffic controllers from which it receives signals.

The invention together with its various features will be more readily understood from the following description which should be read in conjunction with the accompanying drawings, in which:—

Figure 2:
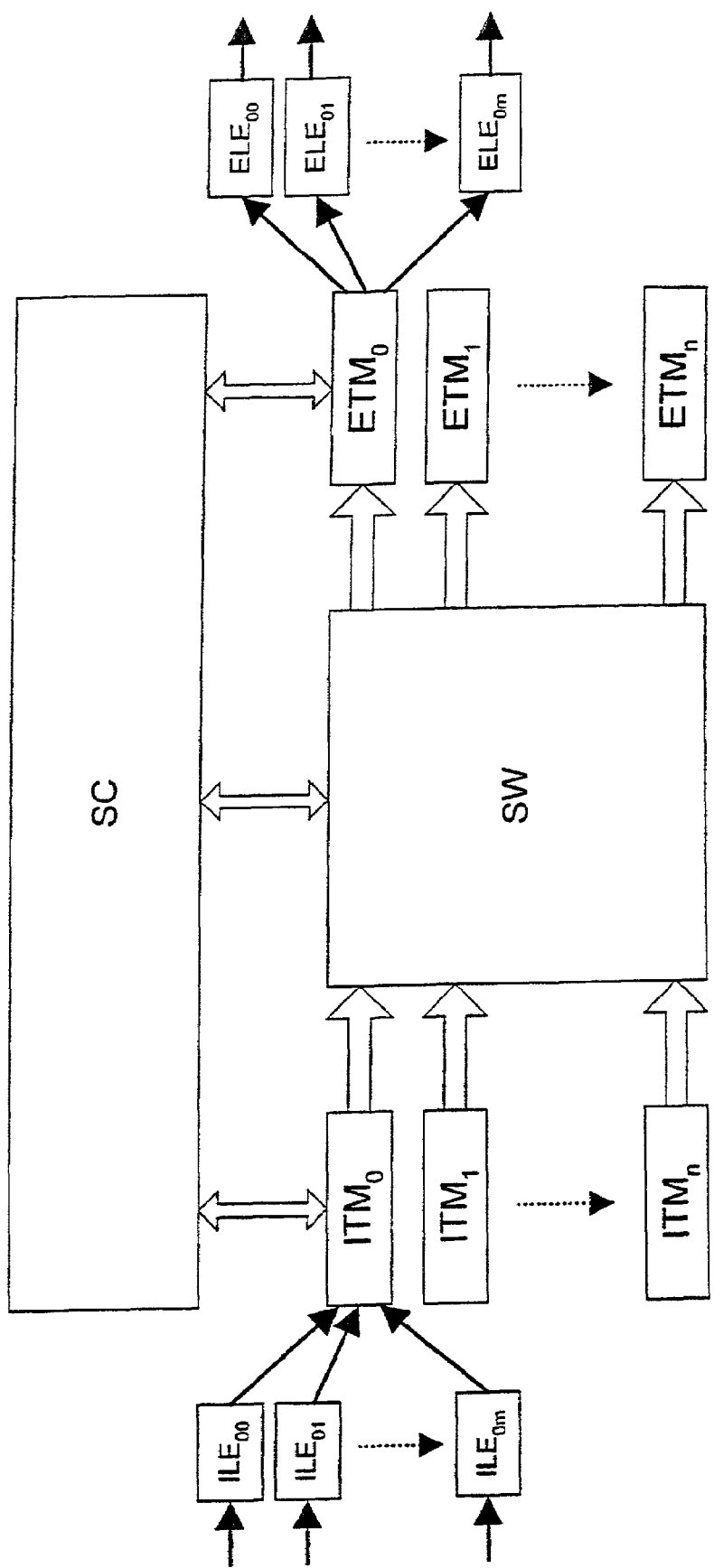
Figure 3:
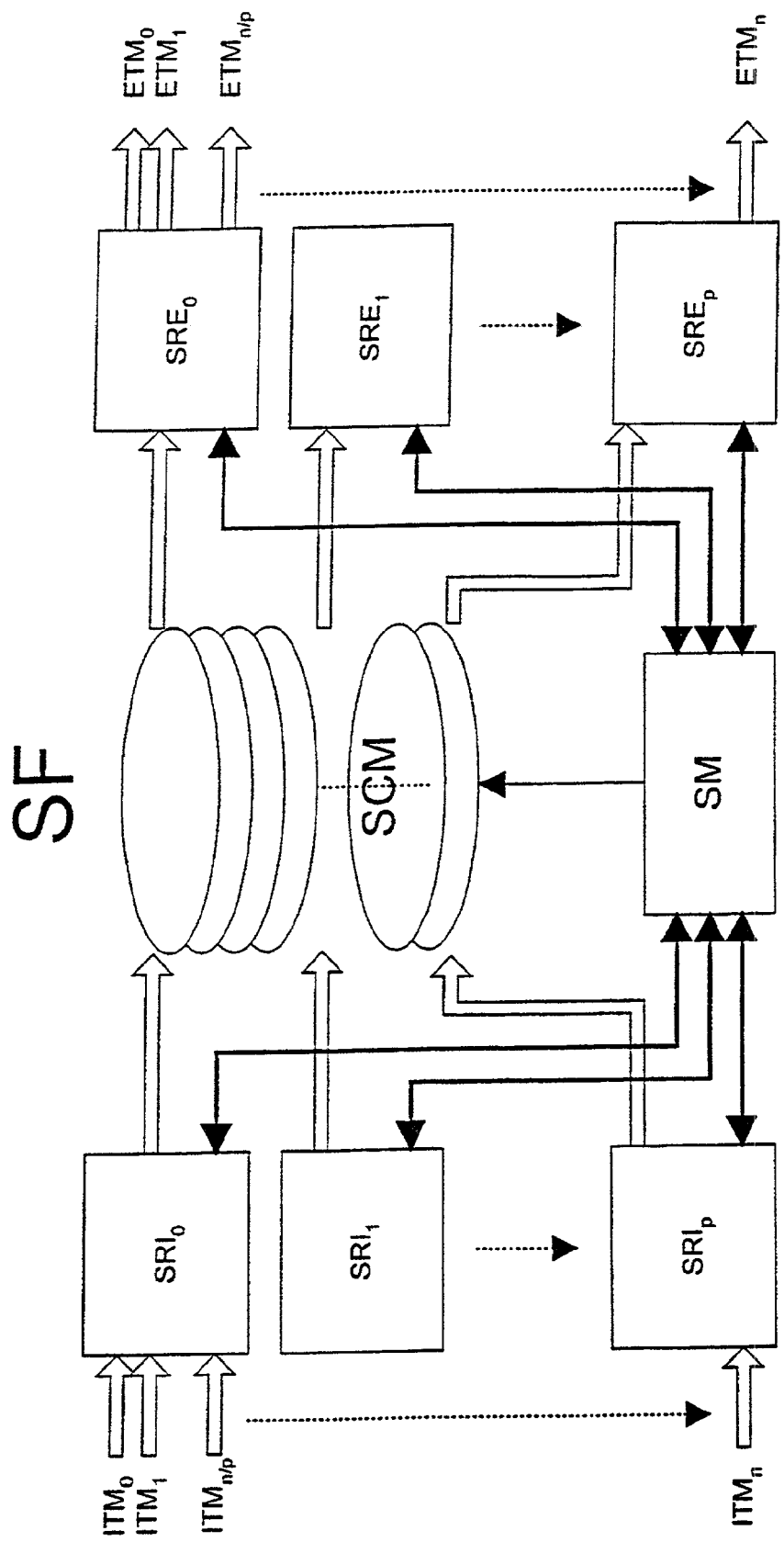
Figure 4:
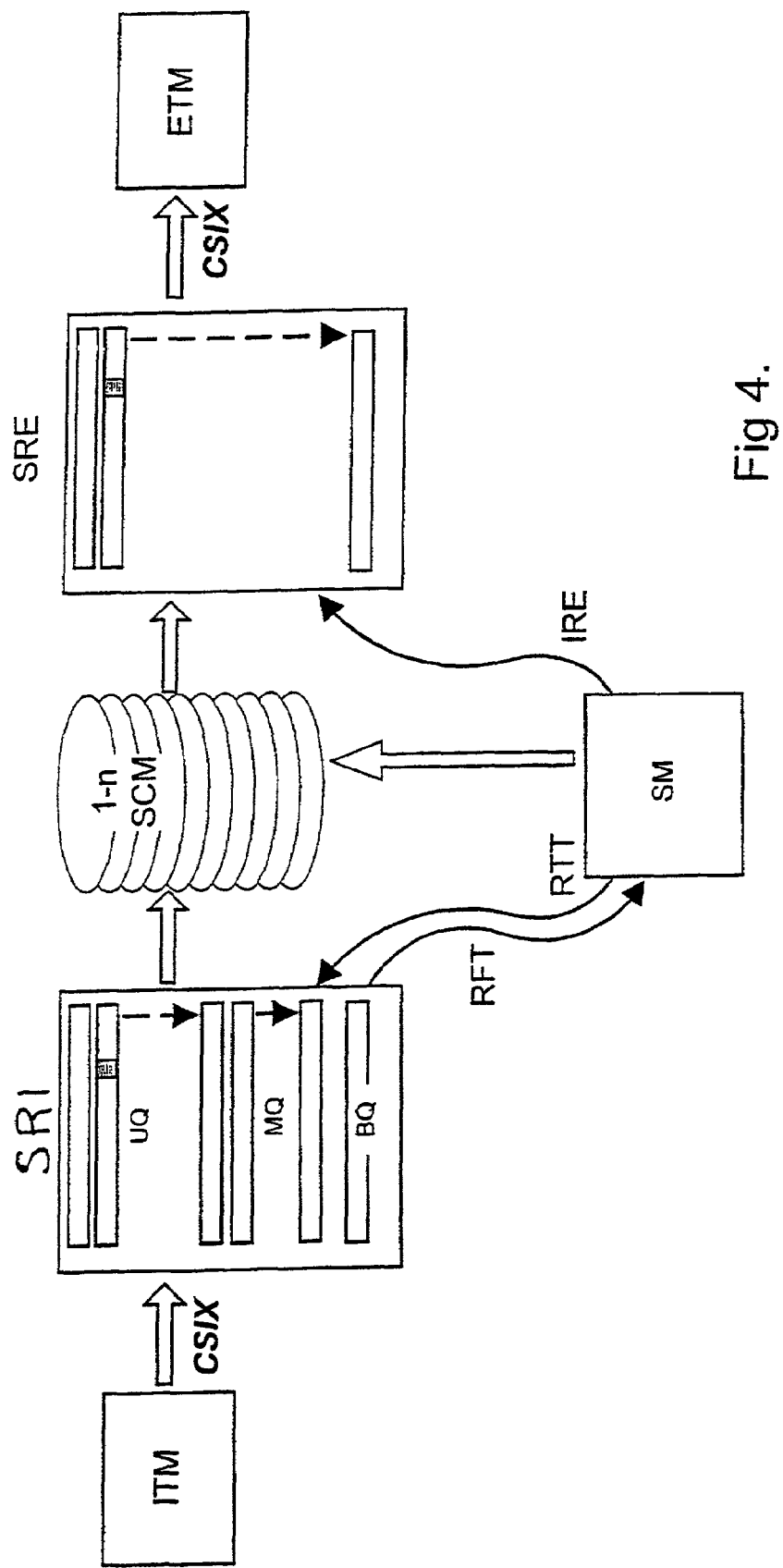
Figure 5:
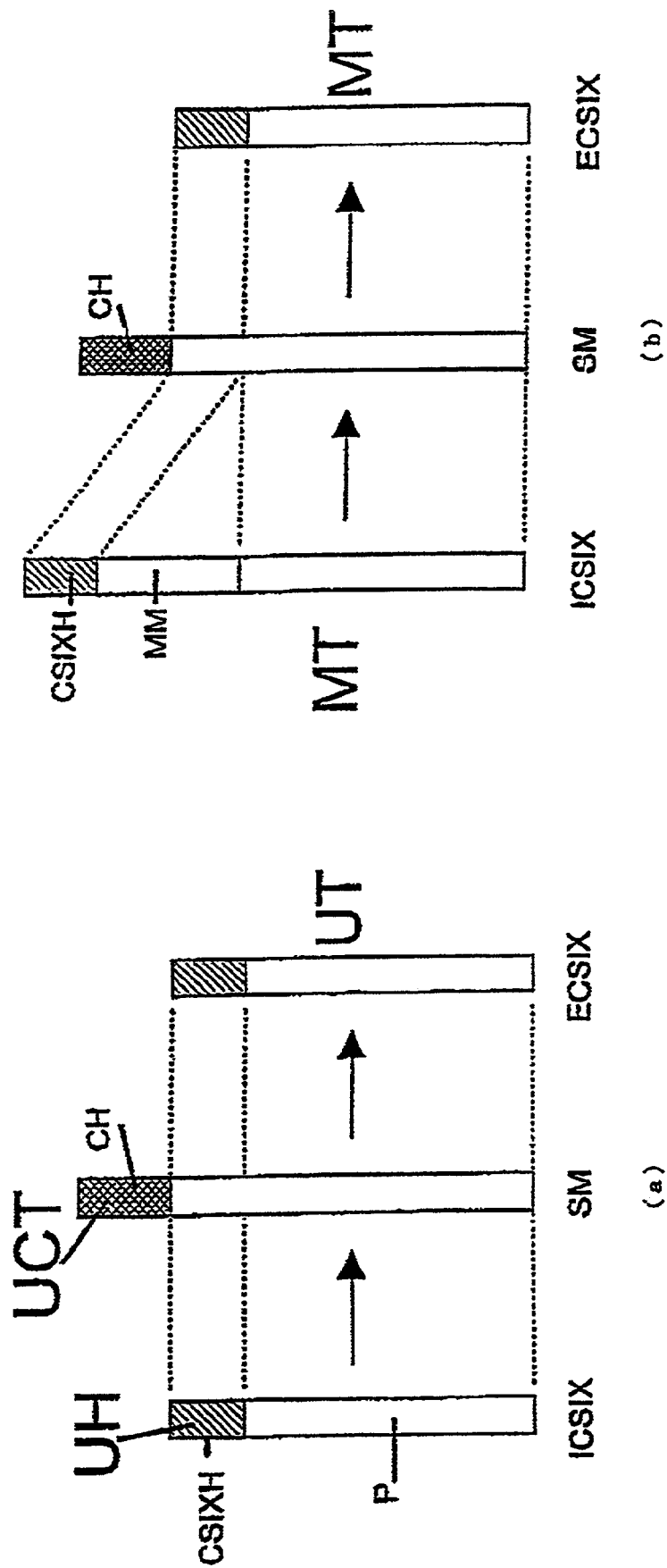
Figure 7:
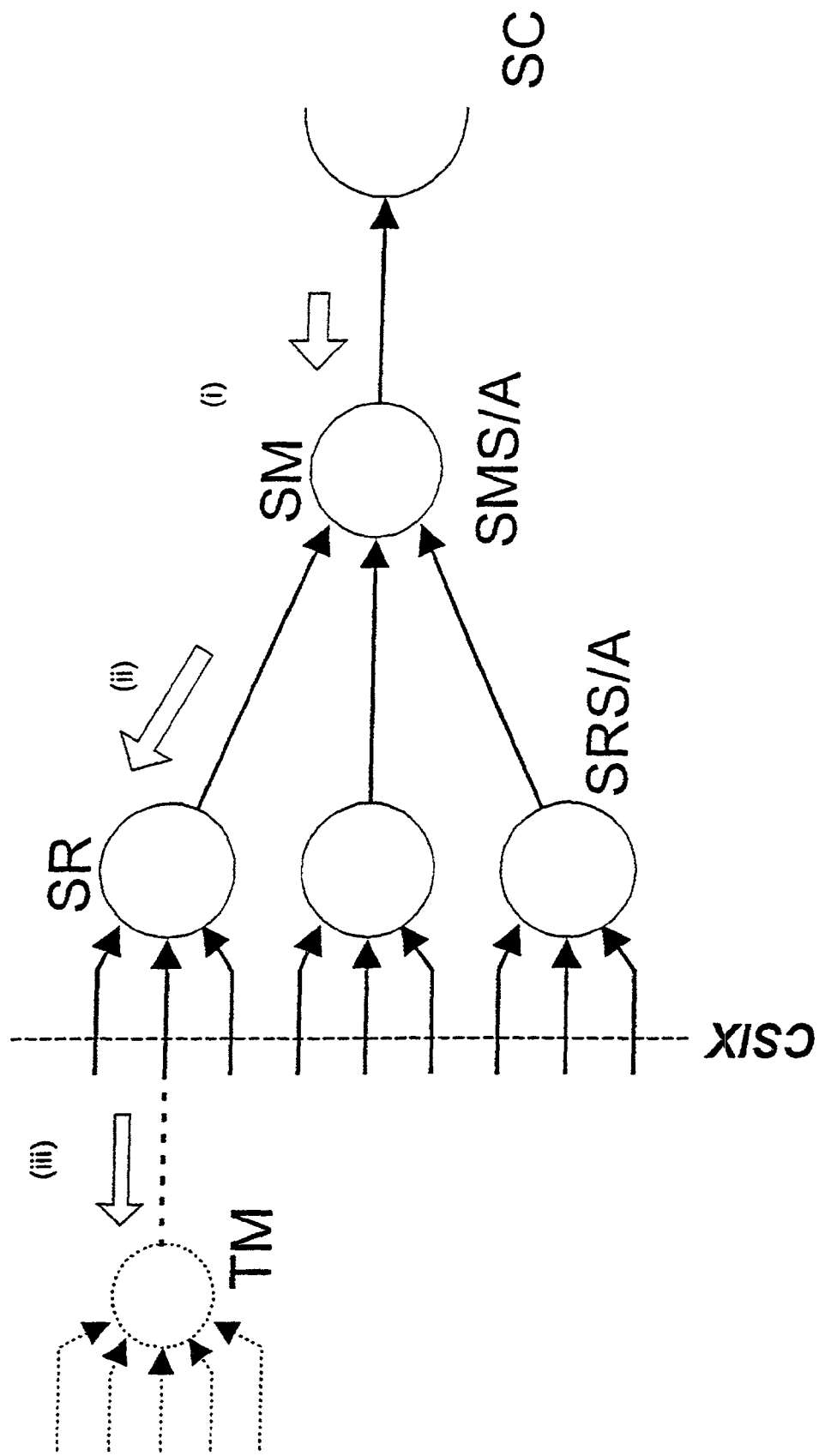
Figure 8:
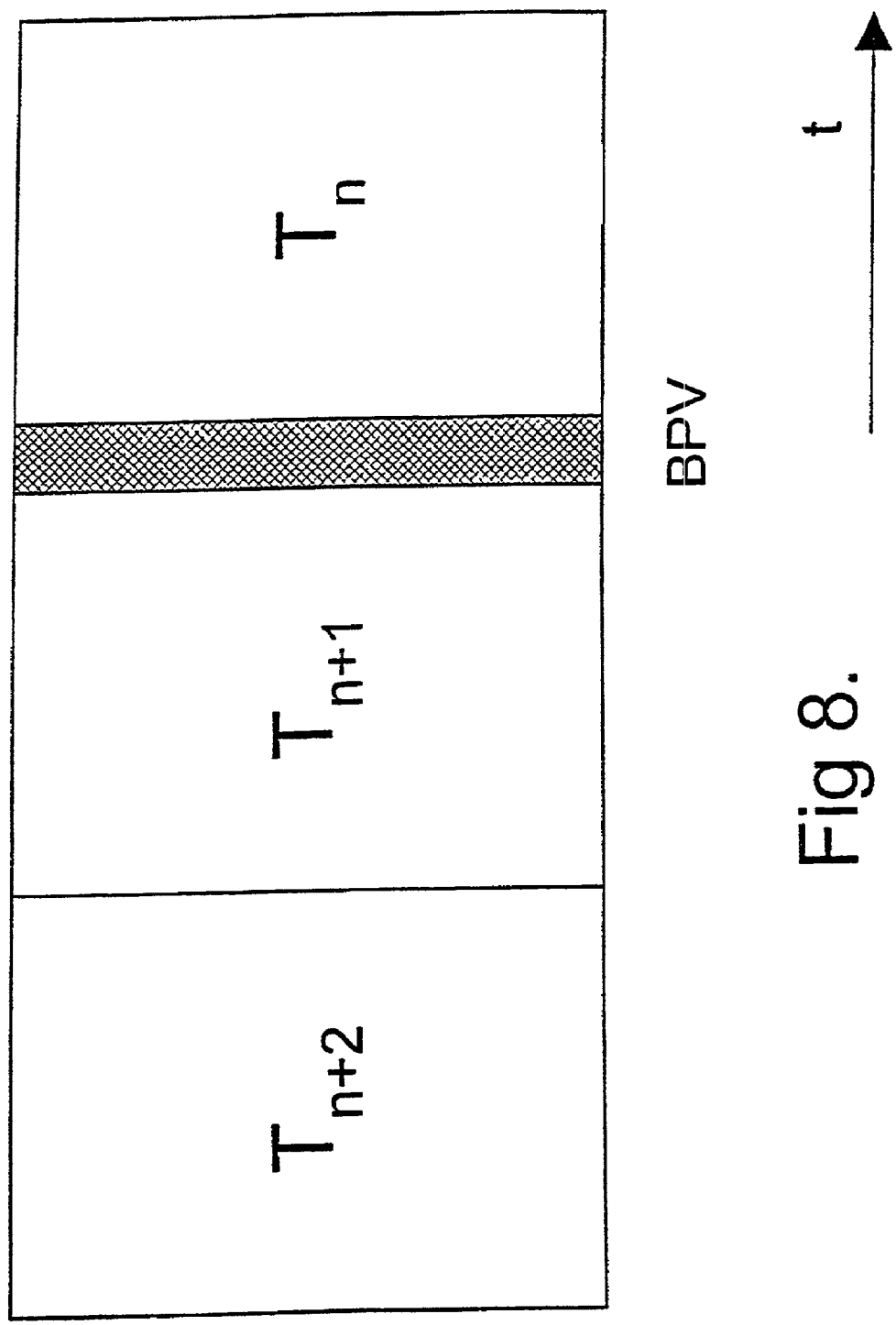
Figure 9:
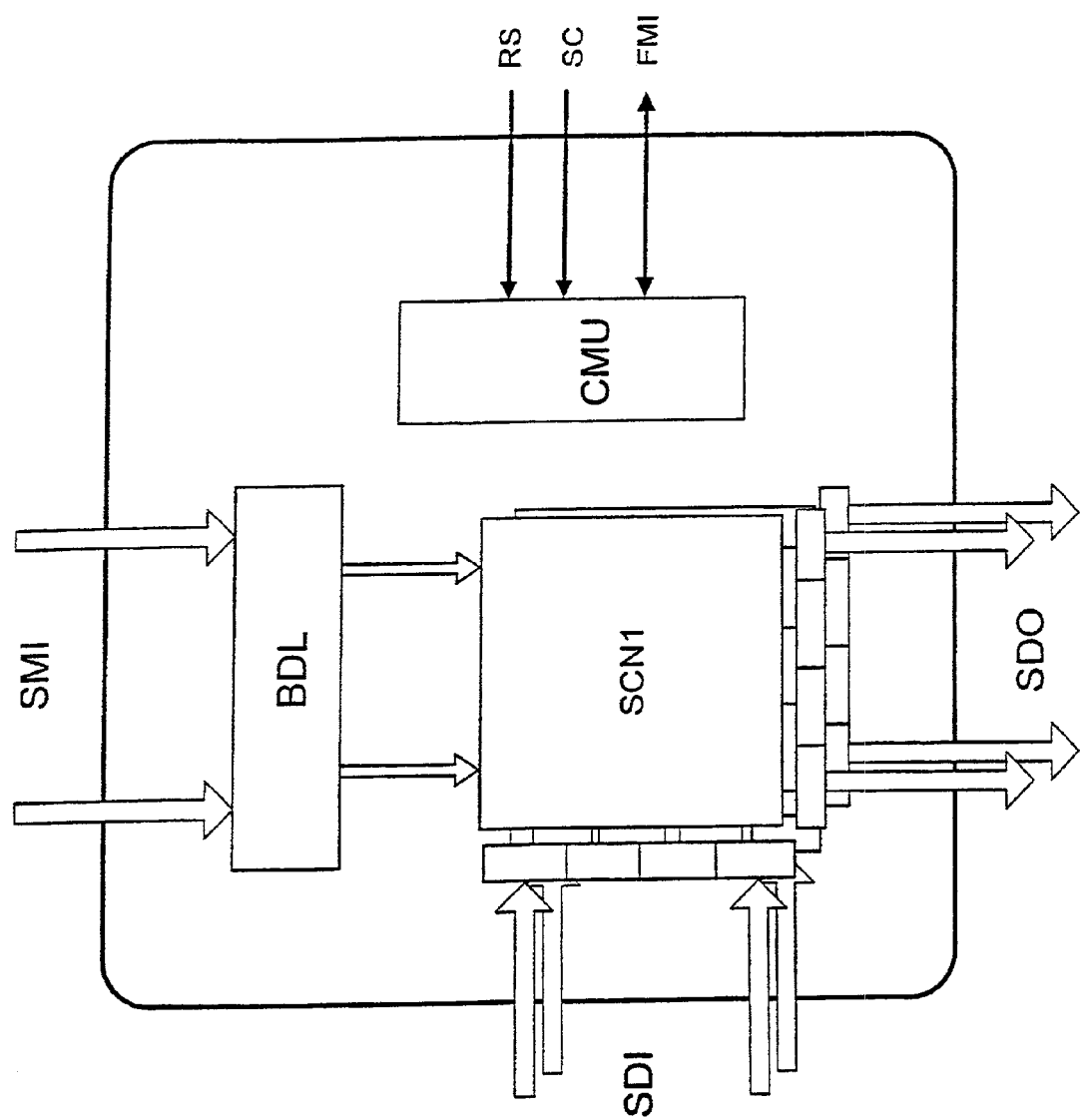
Figure 10:
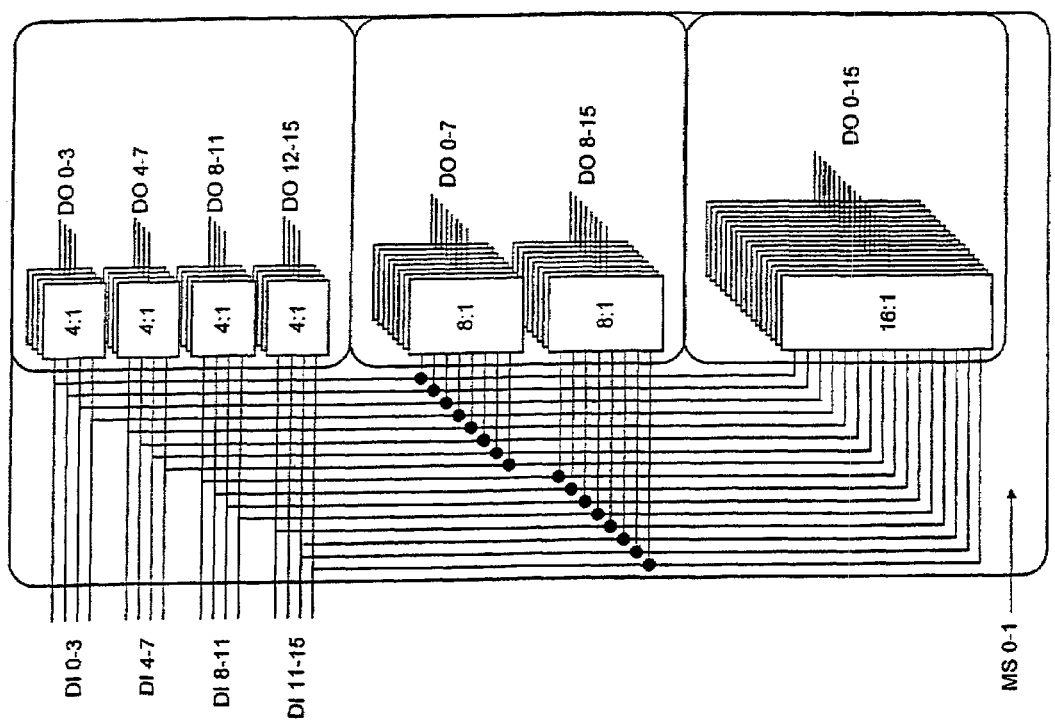
Figure 11:
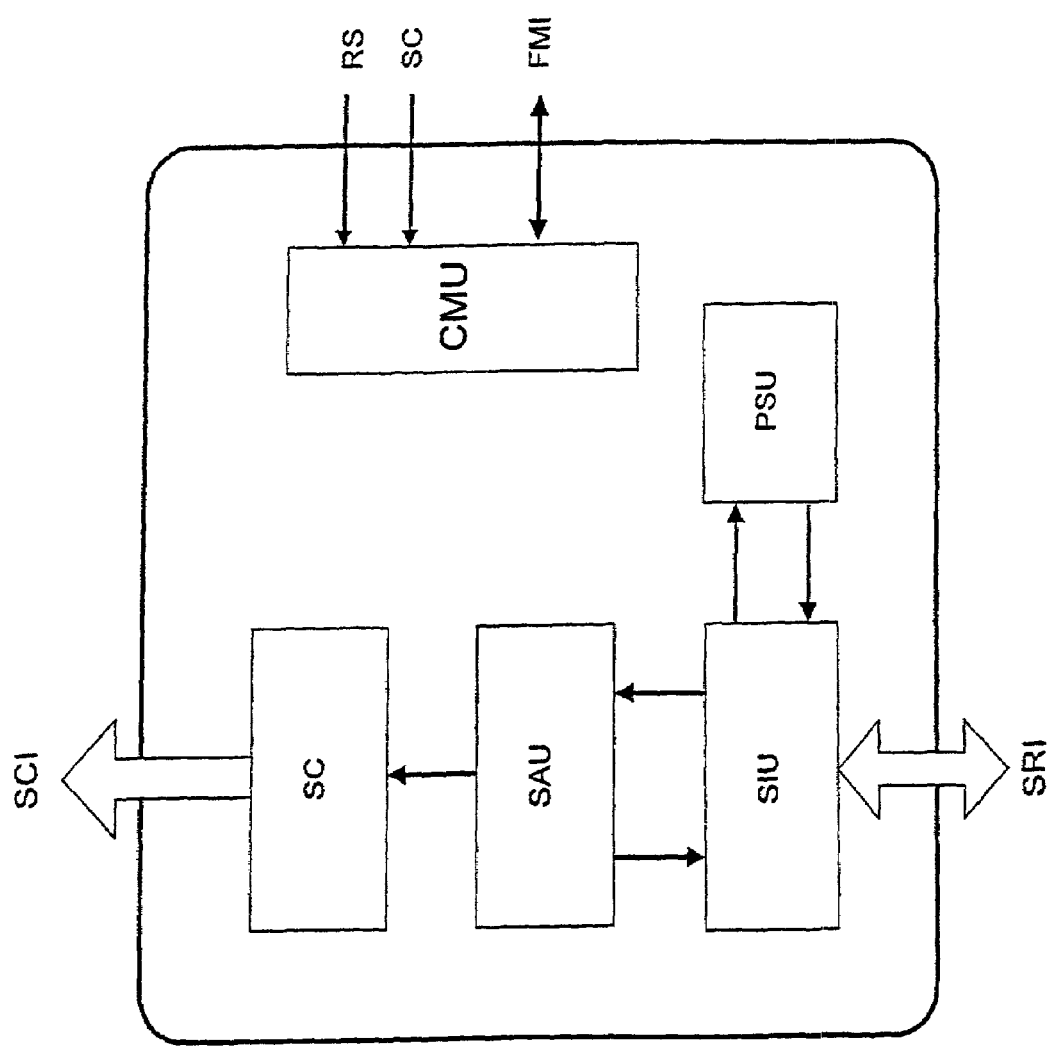
Figure 12:
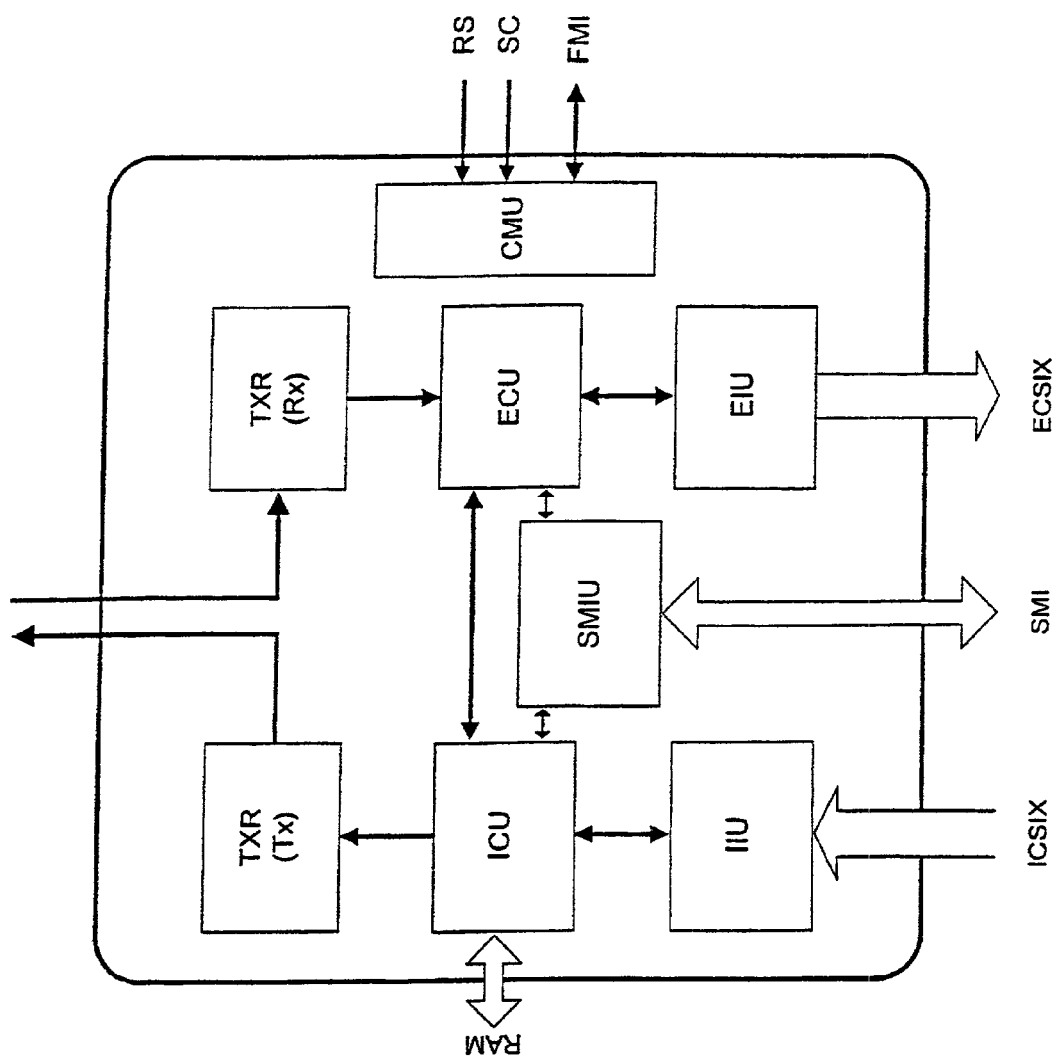
Figure 13:
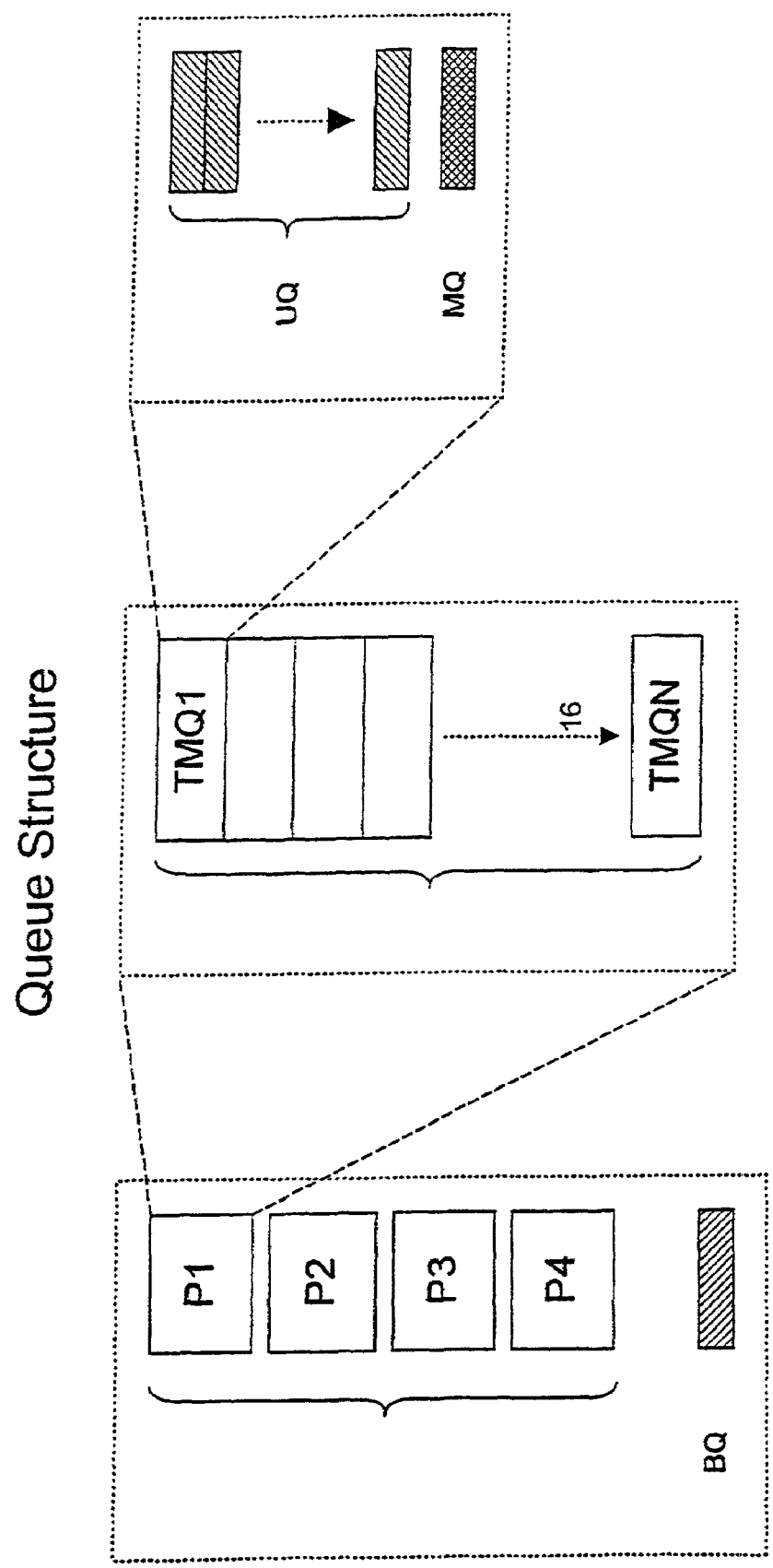

FIG. 1 shows a generalised concept of the prior art,
FIG. 2 shows in block diagram form one embodiment the data switch of the invention,
FIG. 3 shows the switch fabric of the embodiment of the invention,
FIG. 4 shows the flow of data through the switch fabric,
FIG. 5 shows ATM frame headers when passing through the switch fabric,
FIG. 6 shows Ethernet frame headers when passing through the switch fabric,
FIG. 7 shows the scheduling and arbitration arrangements of the data switch,
FIG. 8 shows an egress backpressure broadcast,
FIG. 9 shows the switch block diagram,
FIG. 10 shows the detail of the switch block,
FIG. 11 shows a block diagram of the master according to the embodiment of the invention,
FIG. 12 shows a block diagram of a router according to the embodiment of the invention, whilst
FIG. 13 shows the queue structure.

Referring now to FIG. 1, this shows the general concept of a data switch. Inputs N1 to Nn are connected to respective input ports IP1 to IPn of a data switch SW. The switch has output ports OP1 to OPn connected to respective outputs M1 to Mn.

With intelligent distributed scheduling mechanisms it is possible to create in input buffered switch which meets the same traffic shaping efficiency of its output buffered counterpart. The use of input buffers is preferred for several reasons. Input buffering requires smaller buffers, which can have relatively low performance and therefore be cheaper.

When cells are queued at the input there is the possibility of contention arising through the phenomena of Head Of Line (HOL) blocking. This generally occurs when First In First Out (FIFO) queue mechanisms are used. The FIFO queues the cell at the head of the queue and this is the only one that can be chosen for delivery through the switch. Now, consider the case where an input port has three cells c1, c2, c3 stored such that c1 is at the head of the queue with c2 stored next and c3 last with cell c1 destined for port N and cell c2 destined for port N+1. Now port N is already connected to port N−1 therefore c1 cannot be switched, however port N+1 is unconnected and therefore c2 could actually be delivered. However, c2 cannot get out of the FIFO because it is blocked by the HOL i.e. c1. An intelligent approach to the solution of HOL blocking is the concept of Virtual Output Queues (VOQ). Using VOQs the cells are separated out at the input into queues which map directly to their required output destination. They can therefore be effectively described at being output queues, which are held at the input i.e. Virtual Output Queues. Since the cells are now separated out in terms of their output destination they can no longer be blocked by the HOL phenomena.

There is also the question of Quality of Service (QoS) to address. Different input sources have different requirements in terms of how their data should be delivered. For example voice data must be guaranteed to a very tightly controlled delivery service whereas the handling of computer data can be more relaxed. To accommodate these requirements the concept of priority can be used. Data is given a level of priority, which changes the way the switch deals with it. For example consider two cells in different VOQs c1 and c2 which are both requesting to go to the same output. Although either could be selected only one can be delivered. The cell with the 'highest' priority is chosen. This decision making process is referred to as "arbitration". It is not nly priority which can be a factor in the arbitration process. Another example would involve monitoring the length of the VOQs and also using them as a determining factor. It should also be noted that as switches become faster and larger then a more intelligent approach to arbitration needs to be sought. The ideal solution is for a distributed arbitration mechanism where there exists levels of arbitration right through the switch from the core right back to the inputs. Using such a mechanism arbitration can be very finely tuned to cater for the most demanding quality of service requirements. By using buffers in switches the system runs the risk of losing cells i.e. the buffer overflows. To overcome this problem and also to efficiently size the buffers the concept of backpressure flow control across the switch can be employed. Using backpressure an output can inform the input that is connected to it that it is filling too quickly and is about to lose cells. The input can now back off or slow down the rate at which it is sending the cells and therefore reduce or completely eliminate the risk of cell loss.

This specification describes the implementation of a high-speed digital switch for use in any area in which high speed high performance digital communications is required. Typically this definition covers at least the Data Communications sector and the Cluster Computing sector.

The embodiment of the invention shown in block diagram form in FIG. 2 is centred on a switch fabric that is intended for use in a broad range of data switching applications. Although the invention may be used in a variety of applications, the rest of this description will only focus on the data communications environment.

Referring now to FIG. 2, the main feature is the data switch SW. Inputs are provided to the switch from input traffic manager units $ITM_0$ to $ITM_n$. Each input traffic manager may have one or more input line end devices (ILE) connected to it. Outputs from the switch SW are connected by way of output traffic manager units $ETM_0$ to $ETM_n$ to output line end devices (ELE).

The traffic manager units (ITM and ETM) provide the protocol-specific processing in the switch, such as congestion buffering, input traffic policing, address translation (ingress and egress) and routing (ingress), traffic shaping (ingress or egress), collection of traffic statistics and line level diagnostics. There may also be some segmentation and re-assembly functionality within a traffic manager unit. The line end devices (ILE and ELE) are full-duplex devices and provide the switch port physical interfaces. Typically, line end devices will be operated in synchronous transfer mode, ranging from OC-3 to OC-48 rates or 10/100 and Gigabit Ethernet.

The switch SW provides the application independent, loss-less transport of data between the traffic managers based on routing information provided by the traffic managers and the connection allocation policies determined by the switch control SC. This controls the global functions of the switch such as connection management, switch level diagnostics, statistics collection and redundancy management.

The switching system just described is based on an input-queued non-blocking crossbar architecture. A combination of adequate buffering, hierarchic flow control, and distributed scheduling and arbitration processes ensure loss-less, efficient, and high performance switching capabilities. It should be noted that the ingress and egress functions are shown separately on either side of the drawing. In reality, traffic manager units, line-end devices ingress and egress ports may be considered full duplex FIG. 3 shows the basic architecture of the switch according to one embodiment of the invention. The input traffic manager units ITM described above connect streams of data to a number of ingress routers $SRI_0$ to $SRI_p$. These routers are connected to the switching matrix SCM, which is itself controlled by a switch controller SM. Data outputs from the switching matrix SCM are passed by egress routers $SRE_0$ to $SRE_p$ and on to the output traffic manager units ETM.

The ingress routers $SRI_0$ to $SRI_p$ on the ingress side collect data streams from the input traffic manager units ITM, request connections across the switching matrix SCM to the controller SM, queue up data packets (referred to as "tensors") until the controller SM grants a connection and then sends the data to the switching matrix SCM. On the egress side, the egress routers $SRE_0$ to $SRE_p$, sort data packets into the relevant data streams and forward them to the appropriate output traffic manager units ETM. Each ingress and egress router communicates on a point to point basis with two traffic manager units over a common switch interface. Each interface is 32 bits wide (full duplex) and can operate at either 50 or 100 MHz. Through its common interfaces the routers can support up to 5 Gbs of cell-based traffic such as ATM or 4 Gbs of packet based traffic such as Gigabit Ethernet. These 4 or 5 Gbs of data share a small amount of external memory.

The switch controller SM takes connection requests from the ingress routers and creates sets of connections in the switching matrix SCM. The controller SM arbitration mechanisms maximise the efficiency of the switching SCM while maintaining fairness of service to the routers. The controller SM is able to configure one-to-one (unicast) and one-to-all (broadcast) connections in the switching matrix SCM. The controller SM selects an optimal combination of connections to establish in the matrix SCM once per switching cycle. The selection can be postponed by one (or more) backpressure broadcast requests that are satisfied in a round-robin fashion before allowing normal operation to resume. The arbiter also uses a probabilistic work-conserving algorithm to allocate bandwidth in the switching matrix to each priority according to information defined by the external system controller.

The switching matrix SCM itself consist of a number of memory-less, non-blocking matrix planes SCM1–N and a number of embedded serial transceivers to interface to the routers. The number of matrix planes in a particular switch depends on the core throughput required across the matrix. The core throughput will be greater than the aggregate of the external interfaces to allow for inter-router communication, core header overheads and maximal connections during the arbitration cycles. The device is packaged with two planes of sixteen ports, which can be configured to provide an alternative number of planes/ports. The multiple serial links that comprise the data path between the router and switching matrix are switched simultaneously and therefore act as a single full duplex fat pipe of 8 Gbps. The switching matrix has the feature that it can be configured as a 'N×N' port crossbar device where N can be 4, 8 or 16. This feature can increase the number of planes per package and therefore allows a wide range of systems to be realised cost effectively. For example using the first generation chip set systems of less than 20 Gbs up to 80 Gbs can be easily configured.

Underlying the management of the system is the fabric management interface FMI, which provides an external orthogonal interface into all of the system devices. This level of management provides read/write access to a chosen subset of important registers and RAMs while the device is functioning normally, and will provide access to all the registers and RAMs in a device (using the scan mechanism)

if the system is inoperable. Management access can be used for the purposes of system initialisation, and dynamic reconfiguration. The following features need to be configured via the fabric management interface FMI at system reset but can be modified on a live system: ingress router queue parameter sensitivities, input and output queue thresholds, bandwidth allocation tables in the routers and switch controller and status information. Each device has a primary status register, which can be read to obtain the high-level view of the device status; for example, the detection of non-critical failures. If necessary, more detailed status registers can then be accessed.

If a device or the total system fails, fabric interface management access into the chip-set is still possible. This will normally provide useful information in diagnosing the fault. It can also be used to perform low-level testing of the hardware.

Detailed error management facilities have been built into the system. The management of errors can be considered under the headings of detection, correction, containment and reporting as described below:— a) Detection. Within the system, all interfaces between devices are checked as follows:—parallel interfaces between devices are protected by parity. Serial data being routed from one router to another via the switching matrix is protected by a sixteen bit cyclic redundancy code. This is generated in the ingress router and forms part of the tensor. It is checked and discarded at the egress router. All external interfaces support parity and the common switch interface specification includes optional parity. This is implemented at the system end of the interface. Error checking routines are automatically performed during system initialisation. The FMI protocol includes parity in all of its messages.

b) Correction. If an error is detected in a tensor, because either the data is faulty or the tensor has been misrouted, the system will not correct the error. The tensor is discarded and it is left to a higher level of protocol to carry out any necessary corrective actions. Where errors are detected on certain control interfaces, retries are attempted without any external intervention in order to distinguish between a transient and permanent failure. The fault is reported via the FMI in either case.

c) Containment. The principle of containment is to limit the effect of an error and, as far as possible, continue normal operation. For example if a fault is detected in a particular tensor, that tensor is discarded but the system carries on operating normally. Similarly, if a permanent fault is detected that affects one traffic manager unit or router, that part of the system is disabled whilst the rest of the system continues without a break in service. This may require system management assistance. If redundancy were employed in the system, then at this point the standby device(s) would become operational.

d) Reporting. All faults which allow the reporting infrastructure to continue functioning are logged and reported to the diagnostic system. The device primary status register has a mechanism for reporting different classes of fault separately, so that any necessary action can be quickly determined.

e) Monitoring. In addition to error monitoring, the system contains logs to collect performance monitoring and statistics information. These can be dynamically accessed.

There are certain units within the system that are common to all devices. The two units of most interest are the Central Management Unit and the Fabric Management Interface.

Data is handled throughout the system in fixed length cells. There are several reasons for using fixed length cells, one of which is that the quality of service (QoS) is easier to guarantee when the switch is reconfigured after every switch cycle. In addition, the packet latency is improved for both long and short packets and the buffer management is simplified. In practice, there are slight variations in the format of the cells, due to the need to include steering information in headers at various points. FIG. 4 shows the flow of data through the switch fabric and the functions performed by the seven steps shown in the diagram are detailed below:—

Firstly, packets received from a line end are, where necessary, segmented in a input traffic manager ITM and formed into cells of the correct format to be transferred over the common interface, denoted in FIG. 4 as CSIX;

Secondly, at the ingress router SRI, arriving cells are examined and placed in the appropriate queue. There are several sets of queues, shown here as unicast queues UQ, multicast queues MQ and broadcast queues BQ. In the diagram the cell has been placed into one of the unicast queues;

Thirdly, the arrival of a cell triggers a 'request for transfer' RFT to the controller SM. The cell will be held in the queue until this request is granted;

At step 4, the controller SM executes an arbitration process and determines the maximal connection set that can be established within the switching matrix SCM for the next switching cycle. It then grants the 'request to transfer' RTT and signals the egress router SRE that it must expect a cell.

At the fifth step, the ingress router SRI, having been granted a connection, also executes an arbitration process to determine which cell will be transferred. The cell is transferred through the memory-less switching matrix SCM and into a buffer in the egress router SRE.

As shown at step 6, there is one egress buffer per output traffic manager ETM and arriving cells are examined and placed in the appropriate traffic manager queue in the egress router SRE.

Finally, at step 7, the cell is transferred to the output traffic manager EME over the standard interface CSIX and, where necessary, re-assembled into a packet before onward transmission.

The transfer of data through the system is packaged in cells termed tensors. An arbitration cycle transfers one tensor per router through the switching matric SCM. Each tensor consists of 6 or 8 vectors. A vector consists of one byte per plane of the switching matrix and is transferred through it in one system clock cycle. The sizes of the vector and tensor for a particular application are determined by the bandwidth required in the fabric and the most appropriate cell size. The following sections show the typical packaging of the data as it flows through the system for ATM and Ethernet.

As shown in FIG. 5a, illustrating the ASTM application, payload cells P containing fifty three bytes of data arriving from an input traffic manager ITM across the interface CSIX are re-packaged into 60-byte tensors (6 vectors of 10 bytes). The ingress router analyses the CSIX header UH and wraps the CSIX packet with the core header CH to create a 60-byte tensor UCT in an input queue. When the controller SM grants the required connection the tensor passes through the switching matrix SM in one switch cycle to the egress router which writes the unicast tensor UT into the output queue indicated in the core header. When the tensor reaches the head of the output queue, the core header is stripped off and the remaining CSIX packet is sent to the output traffic manager.

If the CSIX frame type indicates a multicast packet MT as shown in FIG. 5b, the ingress router strips out the multicast mask MM and replicates the packet into the indicated input queues, modifying the target field for each copy as appropriate. The flow then proceeds as for unicast, except that the tensor is written simultaneously into multiple egress buffers after passing through the switching matrix.

In the case of Ethernet or variable length packets as shown in FIG. 6, an input traffic manager ITM using segmentation and reassembly functionality (SAR) converts the variable length packets VLP into CSIX packets at ingress, embedding the SAR header in the payload. CSIX packets are then transported though the system in the same way as for the ATM example of FIG. 5, except that the tensor size is set to 80 bytes (8 vectors of 10 bytes) allowing up to 70 bytes of Ethernet frame to be carried in a single segmented packet. Note that the segmentation header is considered as private to the traffic managers and is shown for illustrative purposes only. The system treats it transparently as part of the payload. The CSIX interface description allows for truncated packets, that is, if a traffic manager sends a payload that would not fill a tensor it can send a shortened CSIX packet. The ingress router stores the short packet in the ingress queues (on fixed tensor boundaries). Any part of the tensor queue that is not used is filled with INVALID bytes. The fixed size tensors will then have the INVALID bytes discarded at the egress router.

In the system architecture, the scheduling and arbitration arrangement is distributed and occurs at two points; in the controller SM (between switch ports and between priorities) and in the router (between traffic managers) SRS/A. FIG. 7 is a conceptual diagram showing only the scheduling/arbitration functions across the data switch from the traffic managers TM through the common interface CSIX to the routers SR and the controller SCM into the switching matrix SC port. The diagram also shows how information on channel, link bandwidth allocation and switch efficiency, queue status, backpressure and traffic congestion management is handled by the referenced arrows.

The controller SM provides the overall control function of the system. When the routers request connections from the controller, they identify their requested switching matrix connection by switch port and priority. The controller then selects combinations of connections in the switching matrix to make best use of the matrix connectivity and to provide fair service to the routers. This is accomplished by using an arbitration mechanism. The controller SM can also enforce pseudo-static bandwidth allocation across the priorities and ingress/egress switch port combinations. For example, an external system controller can guarantee a proportion of the available bandwidth to each of the priorities and to specific connections. Unused allocations will be fairly shared between other priorities and connections.

The controller SM also has a 'best effort' mechanism to dynamically bias the arbitration in favour of long queues for applications that do not require strict bandwidth enforcement.

The routers provide an aggregation function for multiple traffic managers into a single switch port. When the controller SM grants a connection to a particular output switch port through a particular priority, the appropriate router must choose one of up to eight unicast and one multicast traffic manager queues to service. This is accomplished through a weighted round-robin mechanism, which can select a queue based on a combination of input queue length. These may allow for favouring of long queues over shorter ones, or allows traffic manager to temporarily increase the weighting of a queue via the urgency field in the CSIX header. Queue bandwidth allocation is also a factor, determined by the external system controller or by dynamic intervention. Finally, target congestion management and traffic shaping are features taken into account. The sensitivity of the weighting function to these parameters are determined for each priority and, together with the bandwidth allocations, may be altered dynamically.

The system implements three levels of backpressure, described in more detail below. These are flow, traffic management and core backpressure. Flow level backpressure occurs between input and output traffic managers for the purposes of congestion management and traffic shaping. Backpressure signalling at this level is accomplished by the traffic managers sending packets of data through the system and hence is beyond the scope of this document. Flow level backpressure packets will appear to the system to be no different than data packets and as such, are transparent.

So far as traffic level backpressure is concerned, the system is organised to manage its data-flow at the traffic manager level of granularity (with four priorities). Further granularity is achieved at the traffic manager itself. An output traffic manager can send backpressure information to the egress side of the router over the CSIX interface, multiplexed with the datastream. Since the egress side of the router has just a single queue per traffic manager, this is just a one-bit signal. Backpressure between routers is signalled via a dedicated broadcast mechanism in the switching controller and switching matrix. There are a number of thresholds in the egress buffer queues. When a threshold is crossed, the egress router signals the controller with a backpressure broadcast request. In the controller, such a request stalls the arbiter at the end of the current cycle and the controller issues a one vector broadcast connection to the switching matrix planes and informs the requesting egress router. The egress router then sends one vector's worth (10 bytes) of egress buffer status through the matrix to the ingress routers. The controller then continues the interrupted cycles. In the event of several egress routers simultaneously requesting a backpressure broadcast, the controller will satisfy all the requests in a simple round-robin manner before resuming normal service. The latency introduced in the backpressure mechanism due to this contention does not affect the egress buffering since during this period a router will only be receiving backpressure data from other routers, which does not need to be queued.

An egress router will aggregate the threshold transitions from all its output queues, which have occurred during a switch cycle into one backpressure broadcast so that the maximum number of backpressure broadcasts between two tensors, is limited to the number of routers. When an ingress router receives a backpressure broadcast vector of the form shown in FIG. 8, it uses it to update the input queue weightings as appropriate.

Two modes of backpressure signalling between egress and ingress routers are supported, namely start/stop and multi-state signalling. Multi-state signalling allows the egress router to signal the multi-bit state of all its queues (1 byte per queue). This multi-state backpressure signalling coupled with weighted-round-robin scheduling in the ingress routers minimises the probability of output queues being full, which is significant when attempting to forward multicast or broadcast traffic in a heavily utilised switch.

The ingress router signals stop/start backpressure to the input traffic managers via the CSIX interface. This provides a 16-bit backpressure signal to allow the ingress router to identify the input queue to which the signal relates. Egress queue thresholds are set globally, whilst input queue thresholds are set per queue.

The controller does not keep track of the state of the egress router buffers. However, core level backpressure, is in place across the router/controller interface to prevent egress buffer overflows, by preventing the controller from scheduling any traffic to a particular egress router in the event that all of the respective routers' buffers are full.

Multicast in this system chipset is implemented through the optimal replication of tensors at ingress and egress. An ingress router has one multicast queue per egress router per priority. An ingress multicast tensor (see FIG. 8) is created in each of the appropriate queues with the egress multicast masks in the target fields TM of the core headers. Each tensor, of which three are shown, has a length equal to 6 or 8 vectors and a width of 10 bytes. A backpressure vector BPV may be inserted between adjacent tensors as shown. The multicast tensors are then forwarded through the core in the same way as for unicast and the egress routers' then replicate the tensors into the required egress buffers in parallel. This multicast mechanism is intended to provide optimum switch performance with a mix of unicast and multicast traffic. In particular, it maintains the efficiency and fairness of the scheduling and arbitration allowing the switch to provide consistent quality of service.

The sytem provides a loss-less fabric, therefore multicast tensors cannot be forwarded through the switching matrix unless all the destination queues are not full. In a heavily utilised switch if only stop/start backpressure from the output queues was implemented, this could severely restrict the useable bandwidth for multicast traffic. Two mechanisms are included in the system to improve its multicast performance. These are: 1. multi-state backpressure from the egress router, which reduces the probability of output queues being full, and 2. increasing the weighting of the multicast input queues in the weighted-round-robin scheduler when they have been blocked to increase their chances of being scheduled when the block clears. To avoid multicast (and broadcast) being blocked by off-line output ports, the backpressure signals can be individually masked out by an external system controller via the Fabric Management Interface (FMI).

The requirement for wire-speed broadcast (benchmarking) is met by having a single on-chip broadcast queue in each egress router. When the controller schedules a broadcast connection, the tensor will be routed in the switching matrix to all routers in parallel, thus avoiding any ingress congestion (no tensor replication at ingress). Broadcast backpressure is provided by having each router inform the controller when it transitions in to or out of the state "all-egress-buffers-not-full". The controller will only schedule a broadcast when all egress buffers in all routers are not full. Broadcast backpressure is a configurable option. If it is not activated, the routers do not send status messages and the controller schedules broadcasts on demand. Using this method there is no guarantee that the packet will be forwarded on all ports.

The switching matrix is shown in schematic form in FIG. 9. It comprises a high-speed, edge-clocked, synchronous, 16 port dual plane serial cross-point switch SCN for use in the system. It has been optimised to provide a scaleable, high bandwidth, low latency data movement capability. It operates under the control of the controller SM, which sends configuration information to the matrix over the controller interface SMI to create connections for the transmission of data between routers. The buffer and decode logic BDL receives this information and uses it to control the interconnections within the matrix. Data is applied in serial form via a serial data input interface SDI and leaves via a serial data output interface SDO. Reset (RS) and clock (CK) signals are applied to the switch as necessary, as are signals to and from the fabric management interface FMI. The form of configuration information, passed in a number of encoded fields, determines which input port should be connected to which output port via the switching matrix. The central management unit CMU shown in FIG. 10 has several functions, including synchronisation of the data transmission between the switching matrix and all its attached transceivers and to cause attached transceivers to phase shift their clocks relative to the external system clock and to maintain this shift during normal running, so as to optimise data reception at the switching matrix of data transmitted from the attached transceivers. A further function is to provide a reset interface to the device.

The N×N matrix shown in FIG. 10 contains a conceptual matrix of internal unidirectional nodes, which allow any input port to be connected to any output port, so that data can be transmitted from any port to any port. It is a square matrix, such that an n-port matrix has $n^2$ such nodes. At any time, each output port is connected to either zero or one input port. When an output port is not connected to an input port the data portion of that output port is always logic '0'. Each switching matrix SM contains two 16 port matrix planes and a full to half speed converter. Each matrix plane can be configured in a number of different formats depending on the number of ports to be attached. Possible configurations per plane are 1×16 port, 2×8 port or 4×4 port matrices. So, in total, each switching matrix SM may be configured as 2 planes×16 ports, 4 planes×8 ports or 8 planes×4 ports as shown in FIG. 10. The converter allows the switching matrix to support systems that contain a mixture of 5 Gbps and 10 Gbps routers. If the matrix is configured to operate as a 16 port device, the controller uses the entire control port field to connect input and output ports. For 4 and 8 port configurations, the number of bits of the control port field required is 2 and 3 respectively.

In operation, the switching matrix receives configuration information from the controller SM via the controller interface SMI. This information is loaded into, and stored in, configuration registers. Routing information is passed in the form of a number of encoded fields determining which input port is to be connected to each output port via the switching matrix. In a 16×16 matrix, there are 16 output ports. For each output port there is a four bit source address which is encoded to define which input port is to be connected to an output port. There is also an enable signal for each field to signal that the field is valid and a configure signal that indicates that the whole interface is valid. If a field is signalled as not valid, the output port for that field is not connected. If the configure signal is not asserted, the matrix does not change its current configuration. The configuration information on the controller/matrix interface is loaded into the device when the configure signal is asserted. A 16-stage programmable pipeline is used to delay the configuration information until it is required for switching the matrix. If there is a parity error on a port then that ports enable signal will be set to zero and a null tensor will be transmitted to the output of that port. The register that holds the parity error may only be loaded when the configure signal is high and is cleared when read by the diagnostic unit. A parity check is also carried out on the configure signal. If a parity error occurs here then a parity fail condition is asserted, all port enable signals are set to zero and all the output ports on the device will transmit null tensors. The connection between the routers and the matrix is via a set of serial data streams, each running at one Gbaud. Once a connection across the matrix has been set up, tensors are transmitted between ingress and egress routers. The whole process exhibits low latency due to a very small insertion delay. Multiple switching matrices can be configured in parallel to provide a highly scalable interconnect function.

FIG. 11 shows the arrangement of the controller SM. The primary function of this is to establish and manage connections through the switching matrix to satisfy data movement requirements between user applications. Its bandwidth allocation algorithms have been designed such that bandwidth is allocated efficiently and fairly. The controller maintains a high throughput and guarantees that no queue starvation is experienced. A priority selector PSU is responsible for selecting which priority level of vectors is to be scheduled at any given time. It receives input from the router interface units SRI about the states of the queues at each priority level (a function of the length of each queue). Then, based on a bandwidth-priority allocation function built into the unit, it determines the priority level that should be serviced next. The bandwidth-priority function can be loaded during runtime using the fabric management interface FMI referred to above, thus allowing the controller to adjust its priority scheduling characteristics according to the expected load, whenever necessary.

A scheduling and arbitration unit SAU is responsible for determining which set of requests, presented to it are to be granted in the current routing cycle. It attempts to deliver a tensor to each output switch port in every arbitration cycle. When the logic has determined how to route the vectors across the switch fabric, the configuration information is passed on to the router interface SRI and the switching matrix interface SCI logic so that the vectors can be transferred. This unit can set up new configurations of unicast and broadcast connections within the switching matrix every 30 ns, if required. Bandwidth within the switching matrix can be allocated on a per connection basis for applications such as ATM. Alternatively, the matrix is configured according to a probabilistic, work-conserving algorithm located in the priority selector unit PSU.

The router interface unit SIU is provided for every router in the system. Each instance provides the functionality described below. The controller SM monitors the number of tensors in each of the ingress router queues (each router has separate queues for each system destination port, together with a multicast queue, at each of four priority levels). The monitoring is done using a pair of tightly coupled state machines, one in the router and the other in the controller. For small numbers of vectors in a queue, the controller keeps an exact count of the number of vectors. The router notifies the controller when new vectors are added to a queue and the controller decrements the queue size when it schedules one of the vectors in the queue. When there are a larger number of vectors in a queue, the controller keeps only an approximate (fuzzy) count of the queue size and is informed by the router when the queue size crosses predefined boundaries. This minimises the amount of state information that needs to be stored and processed in the controller.

The central management unit CMU is common to all devices. Its functions are to provide the Fabric Management Interface FMI between each device and an external controller, control error management within the device and provide a reset interface RS and reference clocking CK in to each device.

In operation, the controller SM receives requests for connections from the routers over the controller/router interface SRI. As the connection requests arrive, they are queued at the router interface SIU. Since several routers can be requesting connections simultaneously, the controller provides scheduling and arbitration logic to maximise connection efficiency and to ensure that all ports receive a fair level of service, depending on their level of priority. The router interface unit SIU presents requests for each non empty queue to the scheduling and arbitration unit SAU, which determines which tensors can be routed in any given switch cycle. The scheduling and arbitration unit SAU attempts to deliver a tensor to each router in every switch cycle. The arbiter also uses a work-conserving algorithm, located in the priority selection unit PSU, to allocate bandwidth in the switching matrix to each priority according to information defined by the external system controller. Bandwidth can also be allocated on a per connection basis. A typical use for this mechanism would be an ATM 'Connection Admission Control' function dynamically changing the bandwidth allocation.

When the scheduling and arbitration unit SAU creates the requested connection, the associated pair of routers are notified that the connection is to be made and the controller sends the relevant connection control information to the switching matrix to establish the required connection. This is done continuously in a series of switching cycles, where each cycle involves three key steps: determining which connections to set up, setting up the connections and then transferring the vectors. These steps are interleaved so as to keep the switching cycle time as small as possible and the throughput of the resulting fabric as high as possible. The switching cycle time is a multiple of the system clock. The number of system clock cycles per switching cycle affects the operation of the router interface and switching matrix interface. Egress routers can send backpressure to ingress routers via a dedicated broadcast mechanism. Backpressure requests, received across the controller/router interface from egress routers, are serviced before normal connection selections in the scheduling and arbitration unit SAU. The backpressure broadcasts are then serviced in a round robin fashion before allowing normal operation to continue.

There is also another mechanism in the controller/router interface referred to as 'core level backpressure', which prevents the controller from scheduling any traffic to a particular egress router. A router uses core level backpressure when all its egress buffers are full.

The controller is capable of establishing both unicast and broadcast connections in the switching matrix. It is also capable of dealing with system configurations that contain a mixture of 'full' and 'half speed' ports, for example a mixture of 10 Gbit/sec and 5 Gbit/sec routers.

FIG. 12 shows a router device. This is a system port interface control device. Its main function is to support user applications' data movement requirements by providing access into and out of the system. There are two instances of the input interface unit IIU, one for each of the traffic managers that can be connected to a system port. The IIU is responsible for transferring data from a traffic manager into an internal FIFO queue on the router and informing the ICU that it has tensors ready to transmit into the system. The external interface to the traffic manager utilises common system interface CSIX. This defines an n×8-bit data bus; the input interface units IIU operate in a 32-bit mode. The FIFO is four tensors deep to allow one tensor to be transferred to the ICU while subsequent ones are being received.

To generate the tensors, the input interface unit appends a three byte system core header to the CSIX frame prior to passing it, indicating the tensors availability to the ICU. The IIU examines the CSIX header to determine whether the frame is of type unicast, multicast or broadcast and indicates the type to the ICU. If the frame is unicast, the IIU sets a single bit in byte 1 indicating the destination TM, this is derived from the destination address in the CSIX header. If the frame is multicast, a tensor is constructed and sent for each of the 16 system ports that have a non-zero CSIX mask. In the case of a broadcast CSIX frame, byte 1 is set to all 1s by the IIU. The IIU is also responsible for calculating the two byte Tensor Error Check which utilises a cyclic redundancy check.

Traffic manager flow control is provided by making each input interface unit IIU responsible for signalling traffic manager start/stop backpressure information to its associated output interface unit EIU. The IIU obtains this backpressure information by decoding the CSIX control bus. If parity error checking has been enabled (the appropriate bit in a status register is set) and the IIU detects a parity error on CSIX, then an error is logged and the corresponding tensor discarded. This log can be retrieved via the FMI.

The input control unit ICU is responsible for accepting tensors from the input interface units IIUs, making connection requests to the controller interface unit SMIU, storing tensors until the controller grants a connection and then sending tensors to transceivers TXR. There are two types of connection requests (and subsequent grants). One is used for all unicast/multicast tensors and the second is used for broadcast traffic. For unicast/multicast tensors the input control unit/controller interface unit signalling incorporates the system destination port and priority. Clearly for broadcast tensors there is no requirement for a system destination address and since there is only one level of broadcast tensors, a priority identifier is also not required.

Input buffering is illustrated in FIG. 13. This buffering for unicast queuing UQ is implemented such that there is one for each possible destination traffic manager and priority. In addition to unicast queues, there is a multicast queue MQ per port per priority and a single broadcast queue BQ. The queues are statically allocated. There are 512 unicast, 64 multicast and one broadcast queue. The unicast and multicast queues are located in external SRAM. The queue organisation allows flow control down to OC-12 granularity. Within the unicast address field of the CSIX header, 3 bits are allocated for the number of traffic managers a router can support. Since the router supports two traffic managers, the spare bit field is used for a function known as Service Channel. Service Channels provide the means of fully exploiting the routers implicit OC-12 granularity features.

When the input control unit ICU receives a connection grant signal from the Controller interface unit SMIU (which specifies output port and priority), the ICU must choose one of up to 8 qualifying unicast queues or the multicast queue from which to forward a tensor. This is achieved using a weighted round-robin mechanism, that takes into account several parameters. One is the input queue length, which allows for the favouring of longer queues over shorter ones and another is aggregate queue tensor urgency, which allows a traffic manager to temporarily increase the weighting of a queue via the urgency field in the CSIX header. One further parameter taken into account is queue bandwidth allocation, whereby an external system controller or system operator can configure the system to provide bandwidth allocation to individual flows via the FMI. The final parameter considered is that of target output queue backpressure. This requires that the effective performance of the multicast scheme requires that the probability of output queues being full be minimised. The sensitivity of the weighting function to the input variables is controlled by four sets of global sensitivity variables (one per priority). These settings are configured at system initialisation.

To provide an input flow control mechanism, the input control unit ICU implements three watermark levels to indicate the state of the queues (fairly empty, filling up, fairly full or very full). The watermarks have associated hystereis and both values are configurable via the FMI. When a queue moves from one state to another, the ICU signals the change to each of the output interface units EIUs. In addition to this 'multistate' backpressure mechanism it is also possible to invoke a second mode of backpressure signalling that involves only start/stop signalling. The backpressure mechanism mode is selected via the FMI by setting the watermark levels appropriately.

The output control unit ECU signals egress backpressure information to the ICU. This information relates either to the signalling egress router buffers or to information the ECU has received about the state of another egress routers buffers. If the information relates to the signalling egress routers buffers the ICU updates the backpressure status used by the input scheduling algorithm and makes a request to send backpressure information to the controller interface unit SMIU. If it relates to another egress routers buffers then the ICU simply updates its own backpressure status.

There are two instances of the output interface unit EIU, one for each of the traffic managers that are connected to a system port. The output interface unit is responsible for accepting tensors from the ECU and transmitting them as frames over CSIX to the associated traffic manager.

To provide traffic manager flow control, the output interface unit EIU accepts traffic manager start/stop backpressure information from it's associated input interface unit IIU (that is, the one connected to the same traffic manager). If the EIU is currently sending a frame to the traffic manager, then it continues the transfer of the current frame and then waits until a start indication is received before transferring any subsequent frames.

To provide input flow control the EIU accepts input buffer multistate backpressure information from the ICU and sends it immediately to the traffic mamanger.

The output control unit ECU is responsible for accepting tensors from the serial transceivers, when informed by the controller interface untit SMIU of their imminent arrival, and forwarding them to the relevant EIU. The ECU examines the traffic manager mask byte of the system core header to determine the correct destination EIU. In the case of multicast (or broadcast) tensors, multiple bits are set in the mask and the tensors are simultaneously transferred to all the EIUs for which a corresponding bit is set. This feature provides wire speed multicasting at the egress router. The ECU is responsible for checking the tensor error check bytes of the system core header. If the system core error checking has been enabled (i.e. the appropriate bit in a status register is set) and the ECU detects an error, then it is logged and the corresponding tensor discarded. To provide an output flow control mechanism the ECU implements three watermark levels to indicate the state of the egress buffers (fairly empty, filling up, fairly full or very full). When an egress buffer moves from one state to another the ECU signals the change to the ICU. The level of the watermarks is configurable via the FMI. In addition to this multistate backpressure mechanism it is also possible to invoke a second mode of backpressure signalling that involves only start/stop signalling. The type of backpressure mechanism is selected via the FMI by setting the watermark levels appropriately.

The controller interface unit SMIU is responsible for controlling the interface to the controller. Since the controller operates at the system port rather than the traffic manager port level of granularity, the SMIU also operates at this level. The SMIU maintains a count of the number of tensors in the input queues associated with each destination system port. The count is incremented each time the SMIU is informed of a tensor arrival by the ICU and decremented each time the SMIU receives a grant from the controller.

The controller interface unit SMIU contains a state machine that is tightly coupled to a corresponding one in the controller. For small numbers of tensors (less than about six or seven), the SMIU notifies the controller of each new tensor arrival. For larger numbers of tensors, the SMIU only informs the controller when the count value crosses pre-defined boundaries.

The central management unit is common to all devices. Its functions are to provide a FMI between each device and an external controller, control error management within the device and provide a reset interface and reference clocking in to each device.

Referring back to FIG. 12, the routers provide access into the system via CSIX input and output interfaces. On receiving a CSIX packet from the input traffic manager, over the CSIX interface ICSIX, the input interface unit IIU checks the type and validity of the packet. The packet is then wrapped with a core header, the contents of which vary with the packet type. When the core header has been appended, the packet becomes known as a tensor. The input control unit ICU makes a request to the controller through the controller interface SMI for a connection across the switching matrix and stores the tensors until the connection is created. In order to eliminate head of line blocking for unicast traffic, input buffering is organised into separate queues, one for each possible destination traffic manager TMQ1 to TMQN and priority P1 to P4 as shown in FIG. 13. Individual queues per priority are not required to avoid head of line blocking but are advantageous as they allow the controller to enforce bandwidth allocation to each priority in the switch. In addition to the unicast queue there is a multicast queue per port per priority and a single broadcast queue. The unicast and multicast queues are statically allocated in external SRAM. The purpose of this level of buffering is to allow the controller to allocate connections efficiently by giving it a view of the input datastreams and to provide rate matching between the router external interfaces and the router/matrix interface.

When connections are granted, the controller creates a connection across the switching matrix to the requested egress router at a given priority. The input control unit ICU must now choose one of the qualifying unicast or multicast queues from which to forward a tensor to the transceiver for serialisation. This level of router scheduling is done on a weighted-round-robin-basis. Each unicast and multicast queue has weighting associated with it, which is determined by the backpressure from the egress buffers, the queue length, the queue urgency and the static bandwidth allocation. On the egress side the controller informs the router of a tensor's imminent arrival. The output control unit ECU receives this tensor and examines the core header to see which traffic manager to send the tensor to. Tensors are then assembled back into datastreams and forwarded via CSIX to the appropriate traffic manager.

Multicasting in the system is achieved by the optimal replication of tensors at the ingress and egress. On the ingress side a router has one multicast queue per egress router at each priority. Multicast routing information is appended on the ingress side and on arrival at the egress side these masks determine the replication of tensors into the required egress buffers. Broadcast in the system is achieved by having a single on chip broadcast queue at the ingress of each router. When the controller schedules a broadcast connection, the tensor will be routed by the matrix to all egress routers in parallel, thus avoiding any ingress congestion.

There are four interfaces to the router, which are used in normal operation. These are the controller interface, the switching matrix interface, multiple CSIX interfaces and the fabric management interface FMI.

The open standard common switch interface (CSIX) provides for the transfer of data and control information between a traffic manager and a switch fabric and provides the system with a level of protocol independence. The actual operation of CSIX is fundamentally quite simple. A traffic manager is required to compile a 4-byte CSIX header, which includes information such as frame type, destination port, priority and urgency. Urgency is a concept that allows a particular queue in the router to have one of its priorities temporarily favoured in order for it to have a greater chance of being scheduled next. This is one of the features that assists traffic shaping and buffer optimisation and generally helps to maintain a high quality of service. Each CSIX interface is a point to point, bi-directional link between the router and a traffic manager. A single CSIX interface supports one traffic manager up to OC-12. A number of CSIX data paths can be grouped together to support higher bandwidth traffic managers whilst using a single control path. Each CSIX data path is a multiple of 8 bits in each direction (Tx and Rx).

The fabric management interface FMI is implemented as a bit serial interface to/from each system device. It operates at 25 Mhz and uses a proprietary protocol. The FMI performs a number of functions. It is the primary interface for system control of the chip-set. It allows a switch manager to read run time status information. It also allows all the devices to be updated dynamically with information required for bandwidth allocation. The FMI also provides access for system establishment and initialisation.

Each system device contains a logic block known as the fabric management interface unit (FMIU). The FMIU interfaces to the functional logic, also known as the core, within the device in order to provide run-time (read/write) access to a chosen subset of the registers and RAM locations, a mechanism to report run-time fail conditions detected by the device, and scan access (read/write) to the total set of registers in the functional logic while the functional logic is not operational.

The external interface to the fabric management interface unit FMIU requires a number of inputs, including a Hard Reset input which sets the system device into a known state. In particular, it sets the device into a state where the FMIU is fully functional and the serial interface can be used. Hard Reset is expected to be applied when power is first applied to the device, and may also be applied at other times. The external interface also has a serial input and serial output lines and a device locator address field used to identify a particular instance of a device. The device locator field is generated by tie-offs that are determined by the devices physical position in the system.

The main functions of the central management unit (CMU) shown in FIG. 12 include error detection and logging logic. This is responsible for detecting error conditions and states within the chip or on its interfaces. As such, its functionality is spread throughout the design and is not concentrated within a specific block. Errors are reported and stored in the Error and Status registers and logs, which are accessible across the FMI. The CMU also has reset and clock generation logic responsible for the generation and distribution of clocks and reset signals within the device. In addition, the CMU contains test control logic which controls the mechanisms built in for chip test. The target fault coverage is 99.9%. This logic is not used under normal operating conditions. The final function of the CMU is to provide fabric management logic common to all of the system devices which provides access to error logs and configuration data from an external controller. It also provides the functionality for device scan test and PCB testing.

In summary, the central management unit provides access to device testing, system establishment and error and status reporting over the system.

We claim:

1. A method of transmitting information through a data switching apparatus connected to a plurality of input line end devices and output line end devices, said input line end devices transmitting protocol information packets to a data switch for transmission to specific output line end devices, the data switching apparatus comprising a plurality of input traffic manager units a plurality of output traffic manager units and a data switch, the data switch comprising a plurality of input routers, a plurality of output routers, and a memory-less cyclic switch fabric, and a switch controller, said switch fabric being controlled by said switch controller, said input traffic manager units being connected to one or more of said input line end devices, and said output traffic manager units being connected to one or more of said output line end devices, each input traffic manager unit being arranged to convert protocol information packets it receives from the respective input line end devices into fixed length cells having a header, said header indicating the output traffic manager unit connected to the output line end device to which the cell should be sent, each input router being arranged to receive cells from a respective group of said input traffic manager units, and to maintain virtual output queues for each output traffic manager unit;

each output router being arranged to transmit cells to a respective group of said output traffic manager units the method comprising the steps of:

(a) on the arrival of a cell from an input traffic manager unit, examining the cell header at the input router, placing it in a virtual output queue for the output traffic manager unit indicated by the cell header, generating a transfer request including the address of the output traffic manager unit indicated by the header of that cell, and passing said transfer request to the switch controller, wherein the or each of the cell headers includes message priority information, the or each of the transfer requests includes a priority code; and the switch fabric is controlled by the switch controller to connect ones of said input routers to ones of said output routers;

(b) scheduling the passage of the or each of the cells across the switch fabric at the switch controller at each switch style, by using a first arbitration process to select which of said input routers to connect to which of said output routers, and controlling the switch fabric to connect the selected input routers to the corresponding selected output routers;

(c) upon it being determined that a given input router is to be connected to a given output router, performing a second arbitration process at that given input router to select a single virtual output queue, from among the virtual output queues for the output traffic manager units to which the given output router sends cells, and transmitting the cell at the head of the selected virtual output queue across the switch fabric to the given output router; and transmitting the cell by the given output router to the output traffic manager indicated by the cell header.

2. The method according to claim 1, wherein each input router maintains a virtual output queue for each output traffic manager unit and priority level, and upon receipt of a cell the input router places the cell in the virtual output queue for the priority and output traffic manager unit indicated by the cell header.

3. The method according to claim 1, wherein each output router maintains an output queue for each of the output traffic manager units to which it transmits cells.

4. The method according to claim 1, wherein each input router maintains an input buffer for each of the input traffic manager units from which it receives signals.

5. The method according to claim 1, wherein said second arbitration process performed by the given input router is weighted round-robin arbitration process based upon: the length of said output virtual queues of the given input router; an aggregate queue packet urgency; and a backpressure from said output traffic manager.

6. The method according to claim 1, wherein the first arbitration process selects which input routers and output routers to connect, to maximize the number of said transfer requests which can be satisfied.

7. A data switching apparatus for connection to a plurality of input line end devices and output line end devices to transmit protocol information packets received from said input line end devices to specific output line end devices, the data switching apparatus comprising a plurality of input traffic manager units, a plurality of output traffic manager units and a data switch, the data switch comprising a plurality of input routers, a plurality of output routers, an memory-less cyclic switch fabric, and a switch controller, said switch fabric being controlled by said switch controller, each of said input traffic manager units being for connection to one of more of said input line end devices, and each of said output traffic manager units being for connection to one or more of said output line end devices, each of the input traffic manager units being arranged to convert protocol information packets it receives from the respective input line end devices into fixed length cells having a cell header including message priority information, said cell header indicating the output traffic manager unit connected to the output line end device to which the cell should be sent, each of the input routers being arranged to receive cells from a respective group of said input traffic manager units, to maintain a set of virtual output queues for each output traffic manager unit, and, on the arrival of a cell from an input traffic manager unit, to examine the associated cell header, to place it in a virtual output queue for the output traffic manager unit indicated by the associated cell header, to generate a transfer request including the address of the output traffic manager unit indicated by the header of that cell, and to pass said transfer request to the switch controller, each output router being connected to a respective group of said output traffic manager units;

wherein each output router is arranged, upon receipt of a cell having a header which indicates one of that group of output traffic manager units, to transmit the received cell to that indicated output traffic manager unit;

said input routers are arranged to include a priority code in said transfer requests;

the switch fabric is arranged, under the control of the switch controller, to connect ones of said input routers to ones of said output routers;

the switch controller is arranged to schedule the passage of cells across the switch fabric at each switch cycle, by using a first arbitration process to select which of said input routers to connect to which of said output routers, and control the switch fabric to connect the selected input routers to the corresponding selected output routers; and each input router is arranged, upon it being determined that that input router is to be connected to a given output router, to perform a second arbitration process to select a single virtual output queue from among the virtual output queues for the output traffic manager units to which the given output router is connected, and to transmit the cell at the head of the selected virtual output queue across the switch fabric to the given output router.

8. The data switching apparatus according to claim 7, wherein each input router, is arranged to maintain a virtual output queue for each output traffic manager unit and priority level, and the input router is arranged to place a received cell in the virtual output queue for the priority and output traffic manager unit indicated by the cell header.

9. The data switching apparatus according to claim 7, wherein each output router is arranged to maintain an output queue for each of the group of output traffic manager units to which it can send cell.

10. The data switching apparatus according to claim 7, wherein each input router is arranged to maintain an input buffer for each of the input traffic manager units from which it receives signals.

11. The data switching apparatus according to claim 7, wherein said second arbitration process is a weighted round-robin arbitration process based upon: the length of said output virtual queues of the given input router; an aggregate queue packet urgency; and a backpressure from said output traffic manager units.

12. The data switching apparatus according to claim 7, wherein the first arbitration process selects which input routers and output routers to connect, to maximize the number of said transfer requests which can be satisfied.

* * * * *